US011049217B2

(12) United States Patent
Wang et al.

(10) Patent No.: US 11,049,217 B2
(45) Date of Patent: Jun. 29, 2021

(54) MAGNIFYING FEATURE MAP

(71) Applicant: Beijing Sensetime Technology Development Co., Ltd., Beijing (CN)

(72) Inventors: Jiaqi Wang, Beijing (CN); Kai Chen, Beijing (CN); Rui Xu, Beijing (CN); Ziwei Liu, Beijing (CN); Chen Change Loy, Beijing (CN); Dahua Lin, Beijing (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/122,399

(22) Filed: Dec. 15, 2020

(65) Prior Publication Data

US 2021/0104015 A1    Apr. 8, 2021

Related U.S. Application Data

(63) Continuation of application No. PCT/CN2020/075839, filed on Feb. 19, 2020.

(30) Foreign Application Priority Data

Apr. 30, 2019    (CN) .......................... 201910364870.X

(51) Int. Cl.
*G06T 3/40*    (2006.01)
*G06K 9/62*    (2006.01)
(Continued)

(52) U.S. Cl.
CPC .................. *G06T 3/40* (2013.01); *G06K 9/46* (2013.01); *G06K 9/6232* (2013.01);
(Continued)

(58) Field of Classification Search
CPC ...... G06T 3/40; G06K 9/6232; G06K 9/6256; G06K 9/6262; G06K 9/46; G06N 3/0454; G06N 3/08
See application file for complete search history.

(56) References Cited

U.S. PATENT DOCUMENTS 6,236,766 B1 *  5/2001  Zavaljevski .......... G06T 3/4007
                                                       382/254
6,411,305 B1 *  6/2002  Chui ........................ G06T 5/20
                                                       345/660

(Continued)

FOREIGN PATENT DOCUMENTS

CN    105120130 A    12/2015
CN    108734659 A    11/2018

(Continued)

OTHER PUBLICATIONS

International Search Report for Application No. PCT/CN2020/075839, dated May 27, 2020, 4 pages.

(Continued)

*Primary Examiner* — Aaron W Carter

(57) ABSTRACT

An example of the present disclosure provides methods, apparatuses and devices for magnifying a feature map, and a computer readable storage medium. The method includes: receiving a source feature map to be magnified; obtaining N reassembly kernels corresponding to each source position in the source feature map by performing convolution on the source feature map, wherein N refers to a square of a magnification factor of the source feature map; obtaining, for each of the reassembly kernels, a normalized reassembly kernel by performing normalization; obtaining, for each source position in the source feature map, N reassembly features corresponding to the source position by reassembling features of a reassembly region determined according to the source position with N normalized reassembly kernels (Continued)

corresponding to the source position; and generating a target feature map according to the N reassembly features corresponding to each source position in the source feature map.

20 Claims, 10 Drawing Sheets

(51) Int. Cl.
    *G06K 9/46*         (2006.01)
    *G06N 3/04*         (2006.01)
    *G06N 3/08*         (2006.01)

(52) U.S. Cl.
    CPC ......... *G06K 9/6256* (2013.01); *G06K 9/6262* (2013.01); *G06N 3/0454* (2013.01); *G06N 3/08* (2013.01)

(56) References Cited

U.S. PATENT DOCUMENTS

| | | |
|---|---|---|
| 9,262,843 B1 | 2/2016 | Cruz-Albrecht et al. |
| 9,430,708 B2 | 8/2016 | Han et al. |
| 2018/0197037 A1 | 7/2018 | Navarrete et al. |
| 2019/0156144 A1* | 5/2019 | Li ........................ G06K 9/3233 |
| 2019/0206056 A1* | 7/2019 | Georgescu ......... G06K 9/00523 |
| 2019/0303715 A1* | 10/2019 | Jiang ..................... G06N 3/0481 |
| 2020/0250495 A1* | 8/2020 | Chen ....................... G06T 7/136 |
| 2020/0302223 A1* | 9/2020 | Dutta ................... G06K 9/6263 |
| 2020/0364870 A1* | 11/2020 | Lee ...................... G06K 9/6267 |

FOREIGN PATENT DOCUMENTS

| | | |
|---|---|---|
| CN | 109598768 A | 4/2019 |
| CN | 109635882 A | 4/2019 |
| CN | 110084309 A | 8/2019 |

OTHER PUBLICATIONS

Jiaqi Wang, "CARAFE: Content-Aware ReAssembly of FEatures", ICCV 2019 Submission #2495, Oct. 29, 2019, 10 pages.
State Intellectual Property Office of the People's Republic of China, Office Action and Search Report Issued in Application No. 201910364870X, dated Mar. 23, 2021, 6 pages.
Pengcheng Bi et al, "Research on Lightweight Convolutional Neural Nehvork Technology", Computer Engineering and Applications, doi:10.3778/j.issn.1002-8331.1903-0340, Apr. 29, 2019, 11 pages. [English Abstract].

\* cited by examiner

MAGNIFYING FEATURE MAP

CROSS REFERENCE TO RELATED APPLICATIONS

This patent application is a continuation application of International Patent Application No. PCT/CN2020/075839, filed with the China National Intellectual Property Administration (CNIPA) on Feb. 19, 2020, which is based on and claims priority to and benefit of Chinese Patent Application No. 201910364870.X, filed with the CNIPA on Apr. 30, 2019, and entitled "METHOD, DEVICE AND APPARATUS FOR MAGNIFYING FEATURE MAP, AND COMPUTER READABLE STORAGE MEDIUM." The contents of all of the above-identified applications are incorporated herein by reference in their entirety.

TECHNICAL FIELD

The present disclosure relates to computer vision technologies, and in particular to methods, apparatuses and devices for magnifying a feature map, and a computer readable storage medium.

BACKGROUND

In a computer vision task, feature map magnification is one of the most basic operations. For example, in a task requiring intensive prediction such as object detection, image semantic segmentation and image repair, a low-resolution feature map output by a neural network is to be magnified into a high-resolution prediction result for learning or testing of the neural network. For another example, in neural network design, it is also a common practice to fuse a magnified low-resolution feature map with a high-resolution feature map.

A method of magnifying a feature map may include nearest neighbor interpolation, bilinear interpolation and deconvolution, and the like. The nearest neighbor interpolation and the bilinear interpolation magnify a feature map according to a spatial distance without using rich semantic features contained in the feature map. The deconvolution magnifies a feature map using the semantic features of the feature map with the performance of the magnified feature map to be further improved.

SUMMARY

The present disclosure at least provides methods, apparatuses and devices for magnifying a feature map, and a computer readable storage medium.

According to a first aspect of the present disclosure, there is provided a method of magnifying a feature map. The method includes: receiving a source feature map to be magnified; obtaining N reassembly kernels corresponding to each source position in the source feature map by performing convolution on the source feature map, wherein N refers to a square of a magnification factor of the source feature map; obtaining, for each of the reassembly kernels, a normalized reassembly kernel by performing normalization; obtaining, for each source position in the source feature map, N reassembly features corresponding to the source position by reassembling features of a reassembly region determined according to the source position with N normalized reassembly kernels corresponding to the source position; and generating a target feature map according to the N reassembly features corresponding to each source position in the source feature map.

In combination with any example according to the present disclosure, performing the convolution for the source feature map includes: obtaining reassembly kernel maps with $C_{up}$ channels by performing convolution on the source feature map with $C_{up}$ filters, wherein $C_{up}$ is determined according to the magnification factor and a size of the reassembly kernel; and for each source position in the source feature map, dividing convolution output features in the $C_{up}$ channels that correspond to the source position into N equal parts, wherein each of the parts is taken as one of the reassembly kernels corresponding to the source position and comprises convolution output features in $C_{up}/N$ channels.

In combination with any example according to the present disclosure, the method further includes: obtaining, for each of the reassembly kernels corresponding to the source position, a two-dimensional reassembly kernel by flattening convolution output features in the $C_{up}/N$ channels comprised in the reassembly kernel; and obtaining the reassembly region with the source position as a center, wherein the reassembly region and the two-dimensional reassembly kernel are of equal size.

In combination with any example according to the present disclosure, obtaining, for each of the reassembly kernels, the normalized reassembly kernel by performing the normalization includes: obtaining the normalized reassembly kernel by performing normalization on the convolution output features in the $C_{up}/N$ channels in each of the reassembly kernel.

In combination with any example according to the present disclosure, obtaining N reassembly features corresponding to the source position by reassembling features of the reassembly region with the N normalized reassembly kernels corresponding to the source position includes: obtaining, channel features of each channel corresponding to the reassembly kernel by performing feature reassembly with respect to the reassembly kernel and the reassembly region for each channel of the source feature map respectively, and obtaining, a reassembly feature corresponding to the reassembly kernel by assembling channel features of each channel corresponding to the reassembly kernel.

In combination with any example according to the present disclosure, obtaining channel features of each channel corresponding to the reassembly kernel by performing the feature reassembly with respect to the reassembly kernel and the reassembly region for each channel of the source feature map respectively includes: for each channel of the source feature map, performing weighted summation for the reassembly kernel and on features at corresponding positions in the reassembly region of the channel, and taking a result of the weighted summation as the channel features of the channel corresponding to the reassembly kernel.

In combination with any example according to the present disclosure, generating the target feature map according to the N reassembly features corresponding to each source position in the source feature map comprises: determining a target position in the target feature map that corresponds to the source position according to the source position and the magnification factor, and padding the N reassembly features into the target position in the target feature map.

In combination with any example according to the present disclosure, the source feature map is obtained by performing feature extraction on a sample image with a to-be-trained neural network. Performing convolution on the source feature map comprises: performing convolution on the source feature map by a content encoding convolution layer in the to-be-trained neural network. The method further includes: obtaining a prediction result of the sample image by the to-be-trained neural network according to the target feature map after the target feature map is generated; and adjusting parameters of the to-be-trained neural network based on a difference between a labeled result and the prediction result of the sample image, wherein the parameters of the to-be-trained neural network comprise parameters of the content encoding convolution layer.

In combination with any example according to the present disclosure, the method further includes: performing channel compression for the source feature map by a channel compression convolution layer in the to-be-trained neural network; performing convolution on the source feature map by the content encoding convolution layer (comprises: performing convolution on the channel-compressed source feature map by the content encoding convolution layer; adjusting parameters of the to-be-trained neural network based on the difference between the labeled result and the prediction result of the sample image further comprises: adjusting parameters of the channel compression convolution layer based on the difference between the labeled result and the prediction result of the sample image.

In combination with any example according to the present disclosure, the source feature map is obtained by performing feature extraction on an input image with a trained neural network; performing convolution on the source feature map specifically includes: performing convolution on the source feature map by a content encoding convolution layer in the trained neural network; the method further includes: after the target feature map is generated, obtaining a processing result of the input image by the trained neural network according to the target feature map.

In combination with any example according to the present disclosure, the method further includes: performing channel compression for the source feature map by a channel compression convolution layer in the trained neural network; and performing convolution on the source feature map by the content encoding convolution layer specifically including performing convolution on the channel-compressed source feature map by the content encoding convolution layer.

In combination with any example according to the present disclosure, the input image includes at least one target object to be detected; the trained neural network outputs a bounding box and a class of each target object in the input image according to the target feature map.

In combination with any example according to the present disclosure, the input image includes a missing part; the trained neural network outputs pixels of the missing part of the input image according to the target feature map.

In combination with any example according to the present disclosure, obtaining the processing result of the input image by the trained neural network according to the target feature map includes: outputting a class of each pixel in the input image by the trained neural network according to the target feature map.

In combination with any example according to the present disclosure, obtaining the processing result of the input image by the trained neural network according to the target feature map includes: outputting each instance of the input image and the class of each pixel in each instance of the input image by the trained neural network according to the target feature map.

According to a second aspect of the present disclosure, there is provided an apparatus for magnifying a feature map. The apparatus includes: a source map receiving module, configured to receive a source feature map to be magnified; a kernel generating module, configured to obtain N reassembly kernels corresponding to each source position in the source feature map by performing convolution on the source feature map, wherein N refers to a square of a magnification factor of the source feature map; a normalization processing module, configured to obtain a normalized reassembly kernel by performing normalization for each reassembly kernel; a feature reassembling module, configured to obtain N reassembly features corresponding to each source position in the source feature map by reassembling features of a reassembly region determined according to the source position using N normalized reassembly kernels corresponding to the source position; and a target map generating module, configured to generate a target feature map according to the N reassembly features corresponding to each source position in the source feature map.

In combination with any example according to the present disclosure, the kernel generating module is specifically configured to: obtain reassembly kernel maps with $C_{up}$ channels by performing convolution for the source feature map with $C_{up}$ filters, wherein $C_{up}$ is determined according to the magnification factor and a size of the reassembly kernel; and for each source position in the source feature map, divide convolution output features in the $C_{up}$ channels that correspond to the source position into N equal parts, wherein each of the parts is taken as one of the reassembly kernels corresponding to the source position and comprises convolution output features in $C_{up}/N$ channels.

In combination with any example according to the present disclosure, the feature reassembling module is further configured to: obtain a two-dimensional reassembly kernel by flattening convolution output features in the $C_{up}/N$ channels comprised in the reassembly kernel; and obtain the reassembly region with the source position as a center, where the reassembly region and the two-dimensional reassembly kernel are of equal size.

In combination with any example according to the present disclosure, the normalization processing module is specifically configured to obtain a normalized reassembly kernel by performing normalization for the $C_{up}/N$ channels of convolution output features in the reassembly kernel.

In combination with any example according to the present disclosure, the feature reassembling module is configured to: obtain, for each reassembly kernel of the N normalized reassembly kernels, channel features of each channel corresponding to the reassembly kernel by performing feature reassembly with respect to the reassembly kernel and the reassembly region for each channel of the source feature map respectively; and obtain, for each reassembly kernel of the N normalized reassembly kernels, a reassembly feature corresponding to the reassembly kernel by assembling channel features of each channel corresponding to the reassembly kernel.

In combination with any example according to the present disclosure, the feature reassembling module is configured to, for each channel of the source feature map, perform weighted summation for the reassembly kernel and on features at corresponding positions in the reassembly region of the channel, and take a result of the weighted summation as the channel features of the channel corresponding to the reassembly kernel.

In combination with any example according to the present disclosure, the target map generating module is specifically configured to, determine a target position in the target feature map that corresponds to the source position according to the source position and the magnification factor, and pad the N reassembly features into the target position in the target feature map.

In combination with any example according to the present disclosure, the apparatus for magnifying a feature map is involved in a to-be-trained neural network; the source feature map received by the source map receiving module is obtained by performing feature extraction on a sample image using the to-be-trained neural network; the kernel generating module is configured to perform convolution on the source feature map by a content encoding convolution layer in the to-be-trained neural network; the apparatus further includes a prediction processing module and a parameter adjusting module; the prediction processing module is configured to obtain a prediction result of the sample image according to the target feature map after the target map generating module generates the target feature map; the parameter adjusting module is configured to adjust parameters of the to-be-trained neural network based on a difference between a labeled result and the prediction result of the sample image, where the parameters of the to-be-trained neural network include parameters of the content encoding convolution layer.

In combination with any example according to the present disclosure, the apparatus further includes a channel compressing module configured to perform channel compression on the source feature map by a channel compression convolution layer in the to-be-trained neural network; the kernel processing module is configured to perform convolution for the channel-compressed source feature map by the content encoding convolution layer; the parameter adjusting module is further configured to adjust parameters of the channel compression convolution layer based on the difference between the labeled result and the prediction result of the sample image.

In combination with any example according to the present disclosure, the apparatus for magnifying a feature map is involved in a trained neural network; the source feature map received by the source map receiving module is obtained by performing feature extraction on an input image by the trained neural network; the kernel generating module is configured to perform convolution for the source feature map by a content encoding convolution layer in the trained neural network; the apparatus further includes a result outputting module configured to obtain a processing result of the input image according to the target feature map after the target map generating module generates the target feature map.

In combination with any example according to the present disclosure, the apparatus further includes a channel compressing module configured to perform channel compression for the source feature map by a channel compression convolution layer in the trained neural network; the kernel processing module is configured to perform convolution for the channel-compressed source feature map by the content encoding convolution layer.

In combination with any example according to the present disclosure, the input image includes at least one target object to be detected; the result outputting module is configured to output a bounding box of each target object and a class of the target object in the input image according to the target feature map.

In combination with any example according to the present disclosure, the input image includes a missing part; the result outputting module is configured to output pixels of the missing part of the input image according to the target feature map.

In combination with any example according to the present disclosure, the result outputting module is configured to output each instance of the input image and a class of each pixel in each instance of the input image according to the target feature map.

In combination with any example according to the present disclosure, the result outputting module is configured to output the class of each pixel in the input image according to the target feature map.

According to a third aspect of the present disclosure, there is provided a device for magnifying a feature map. The device includes a memory and a processor. The memory stores computer readable instructions operable on the processor, and the processor is configured to execute the computer readable instructions to implement the method of magnifying a feature map according to any example of the present disclosure.

According to a fourth aspect of the present disclosure, there is provided a non-transitory computer readable storage medium storing computer programs. The programs are executed by the processor to implement the method of magnifying a feature map according to any example of the present disclosure.

According to the methods, apparatuses and devices for magnifying a feature map and the computer readable storage medium in one or more examples of the present disclosure, reassembly kernels corresponding to different positions are obtained by performing convolution using contents of the different positions in the source feature map, so that different reassembly kernels corresponding to different positions are obtained even for the same source feature map. In other words, by perceiving the contents of the position in the source feature map, the reassembly kernel obtained in the examples corresponds to the position in the source feature map. Therefore, when the reassembly kernel is used to reassemble feature for the source feature map, the contents in the source feature map are fully utilized, and therefore, the feature map may be magnified at a higher accuracy rate, thus improving the performance of magnifying feature map.

BRIEF DESCRIPTION OF THE DRAWINGS

To describe the one or more examples of the present disclosure more clearly, drawings required in descriptions of the examples of the present disclosure will be briefly introduced below. The drawings described below are merely one or more examples of the present disclosure, and other drawings may also be obtained by those of ordinary skill in the art based on these drawings without paying creative work.

DETAILED DESCRIPTION OF THE EMBODIMENTS

To help those skilled in the art to understand one or more examples of the present disclosure better, the one or more examples of the present disclosure will be described clearly and fully below in combination with the drawings in one or more examples of the present disclosure. The described examples are merely some examples of the present disclosure rather than all examples. Other examples achieved by those of ordinary skill in the art based on one or more examples of the present disclosure without paying creative work shall all fall into the scope of protection of the present disclosure.

A feature map magnification is widely applied in a plurality of tasks such as object detection and image semantic segmentation. The present disclosure provides a method of magnifying a feature map, in which reassembly kernels corresponding to different positions may be obtained according to the contents of the different positions in a to-be-magnified feature map. If the to-be-magnified feature map is referred to as a source feature map and a magnified feature map is referred to as a target feature map, the reassembly kernels serve to obtain features in the target feature map according to features in the source feature map.

Since the method obtains the reassembly kernels based on the contents of different positions of the feature map, the method may be referred to as a "content-aware feature map magnification method or "Content-Aware ReAssembly of Features (CARAFE)".

Figure 1:
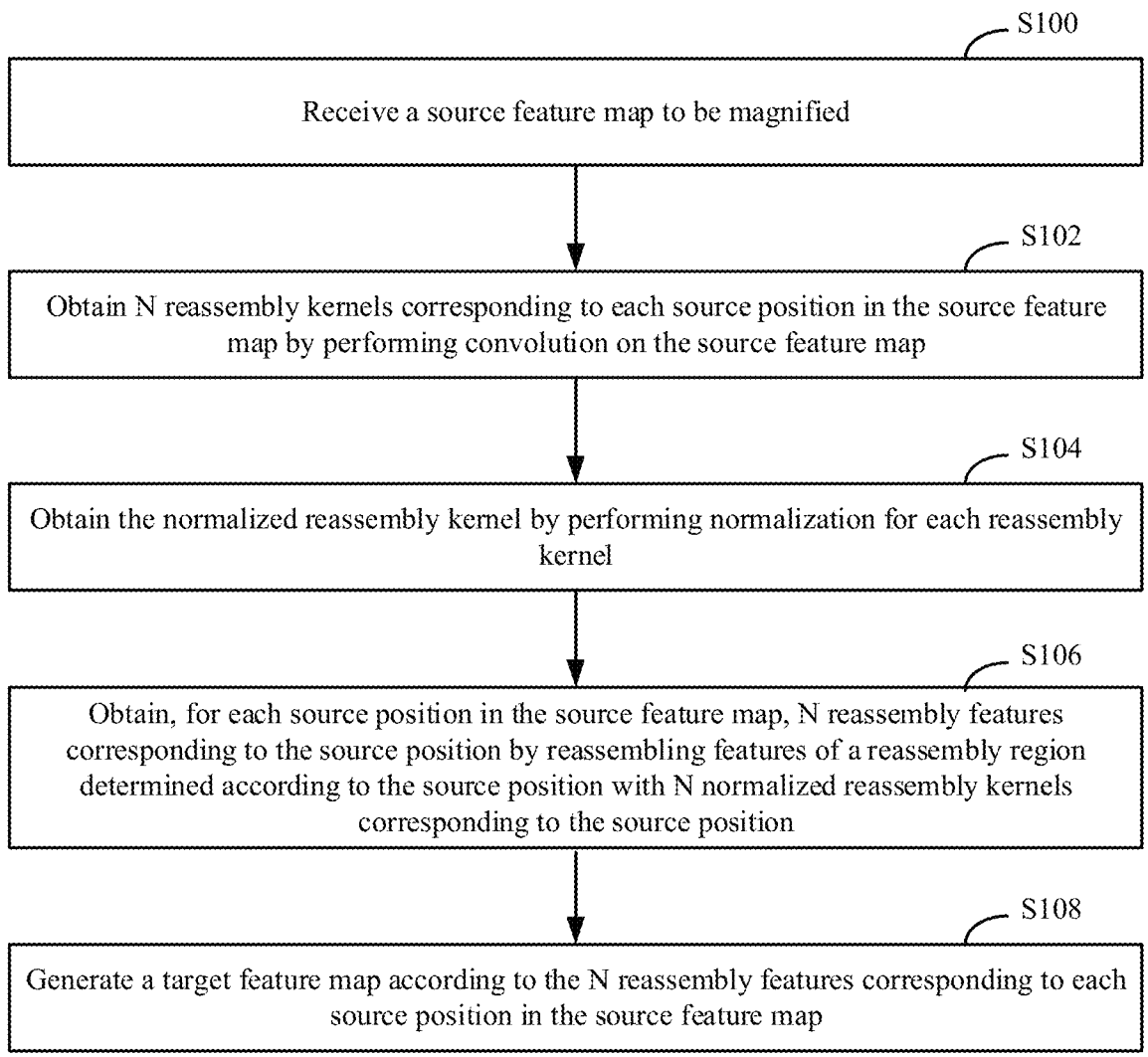
FIG. 1 is a flowchart illustrating a method of magnifying a feature map according to at least one example of the present disclosure.

FIG. 1 is a flowchart illustrating a method of magnifying a feature map according to the present disclosure. As shown in FIG. 1, the method includes the following blocks.

At block S100, a source feature map to be magnified is received. The source feature map may be obtained by performing feature extraction on a training sample image of an input feature map magnification network, or may be obtained by performing feature extraction on a processing target image of the input feature map magnification network.

At block S102, N reassembly kernels corresponding to each source position in the source feature map are obtained by performing convolution on the source feature map.

At this block, the source position may be one pixel in the source feature map. N refers to a square of a magnification factor of the source feature map. The convolution processing refers to performing convolution on the source feature map using a convolution layer, and each source position corresponds to the obtained N reassembly kernels.

At block S104, the normalized reassembly kernel is obtained by performing normalization for each reassembly kernel.

For example, normalization may be performed for the reassembly kernel by softmax, which is not limited in the actual implementation.

At block S106, for each source position in the source feature map. N reassembly features corresponding to the source position are obtained by reassembling features of a reassembly region determined according to the source position with N normalized reassembly kernels corresponding to the source position. The reassembly performed for the features of the reassembly region may also be hereinafter referred to as feature reassembly for the reassembly region.

At this block, one corresponding reassembly feature may be obtained by performing feature reassembly for the reassembly region in the source feature map using each reassembly kernel. In this case. N reassembly features may be totally obtained by N reassembly kernels. The reassembly region may be, for example, a region with the source position as a center, and the reassembly region and the reassembly kernel are of equal size.

At block S108, a target feature map is generated according to the N reassembly features corresponding to each source position in the source feature map.

For example, N reassembly features corresponding to each source position may be padded in a target position that is in the target feature map and corresponds to the source position, to finally obtain the target feature map subsequent to the magnification of the source feature map.

According to the method of magnifying a feature map in this example, the reassembly kernels corresponding to different positions are obtained by performing convolution according to the contents of the different positions in the source feature map. Therefore, different reassembly kernels corresponding to different source positions may be obtained even for the same source feature map. In other words, different from a traditional method in which the same kernel is adopted for all positions in the same source feature map, the reassembly kernels obtained in the examples, by perceiving the contents of the position in the source feature map, corresponds to the position in the source feature map. Therefore, when the reassembly kernel is used to reassemble feature for the source feature map, the contents in the source feature map are fully utilized, and therefore, the feature map may be magnified at a higher accuracy rate, thus improving the performance of magnifying feature map.

Figure 2:
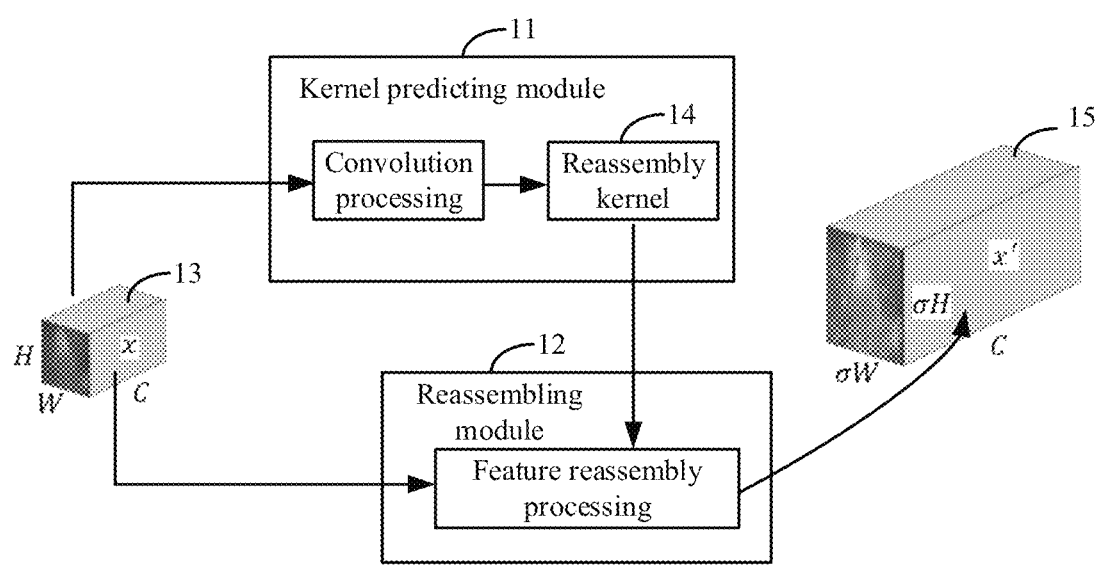
FIG. 2 illustrates a feature map magnification network according to at least one example of the present disclosure.

FIG. 2 illustrates a feature map magnification network. The feature map magnification network may implement the method of magnifying a feature map shown in FIG. 1. As shown in FIG. 2, the feature map magnification network may include a kernel prediction module 11 and a reassembling module 12. When the source feature map 13 to be magnified is input into the feature map magnification network, the kernel prediction module 11 may firstly obtain the reassembly kernels 14 according to the contents of the source feature map 13, and then, the reassembling module 12 may obtain reassembly features by reassembling the features in the source feature map 13 using the reassembly kernels 14. The reassembly features are padded in a corresponding position of the target feature map 15 so as to complete magnification of the source feature map.

The above feature map magnification network, after being trained, is applicable to an actual task. A training stage and an application stage of the feature map magnification network are described below respectively. The training mainly involves adjustment to the parameters of the kernel prediction module 11 and the adjustment to the parameters of the reassembling module 12 may not be done.

Network Training

Figure 3:
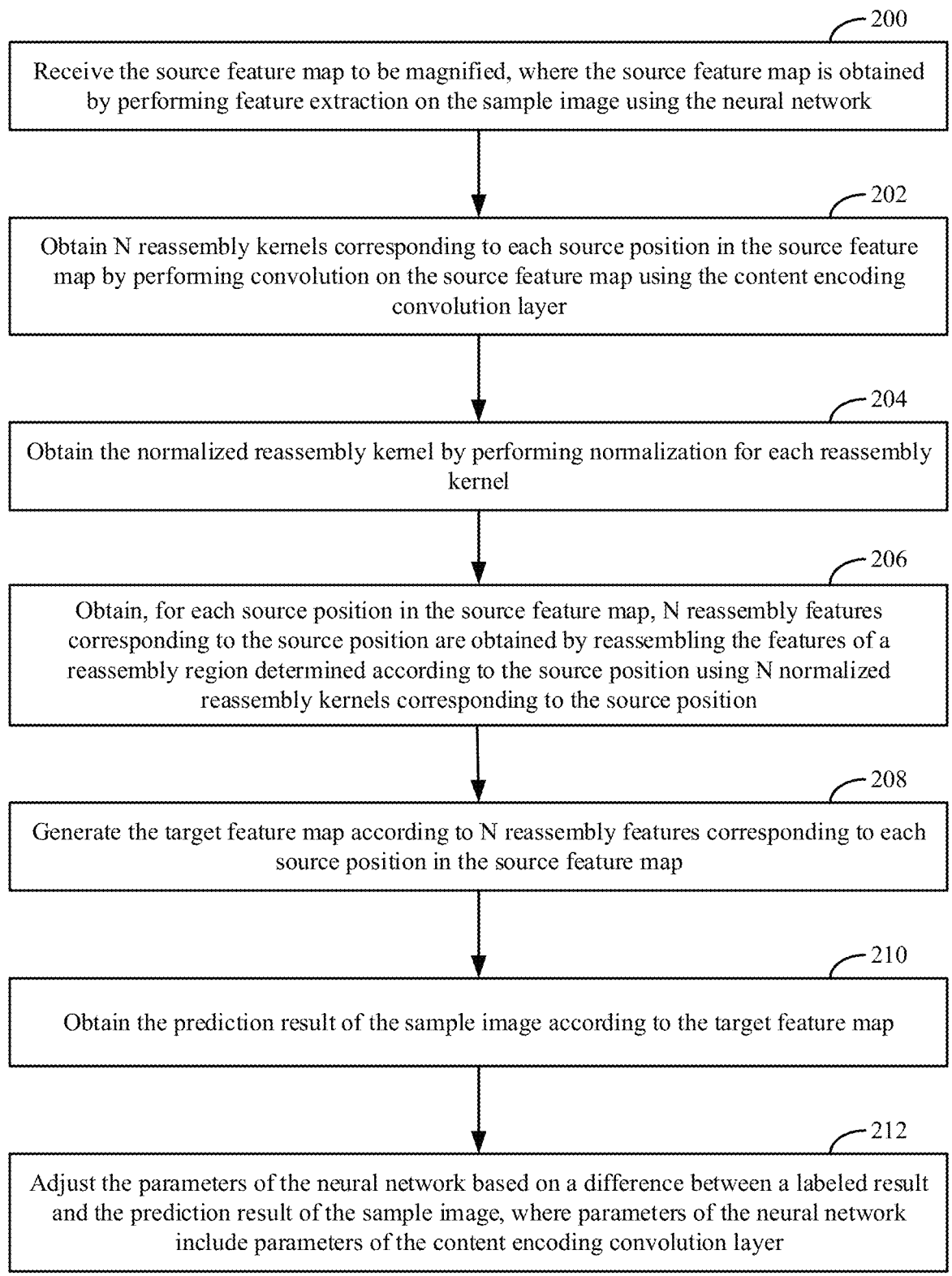
FIG. 3 is a flowchart illustrating a method of magnifying a feature map applicable to a to-be-trained neural network according to at least one example of the present disclosure.

FIG. 3 illustrates a method of magnifying a feature map according to the present disclosure. According to the method, a to-be-trained neural network obtains a source feature map by performing feature extraction on an input sample image, obtain a target feature map by magnifying the source feature map, and then perform network parameter adjustment for a prediction result of the sample image based on the target feature map. Further, during training of the neural network, the feature map magnification network is also trained together, that is, the parameters of the feature map magnification network are adjusted. In combination with FIG. 3 and FIG. 2, the method may include the following blocks.

At block 200, the source feature map to be magnified is received. The source feature map may be obtained by performing feature extraction on the input sample image using the neural network.

At this block, the feature map magnification network may be integrated in a to-be-trained neural network at the training stage of the feature map magnification network. For example, the feature map magnification network may be integrated in a Feature Pyramid Network (FPN) for object detection or in a network for image repair. That is, the feature map magnification network may participate in the training of the neural network as a part of the neural network.

The neural network may obtain the source feature map by extracting the features of the input sample image. The feature map magnification network may magnify the source feature map into the target feature map, then the neural network may obtain the prediction result corresponding to the sample image according to the target feature map.

For example, in combination with FIG. 2, shape parameters of the source feature map may be C*H*W, where C refers to the number of channels in the source feature map. H refers to a height, and W refers to a width. x may be an identifier of the source feature map.

At block 202, N reassembly kernels corresponding to each source position in the source feature map are obtained by performing convolution on the source feature map using the content encoding convolution layer.

The content encoding convolution layer is apart of the feature map magnification network as well as a part of the to-be-trained neural network. At this block, the kernel prediction module 11 of the feature map magnification network may include the "content encoding convolution layer". The content encoding convolution layer may obtain N reassembly kernels corresponding to each source position in the source feature map by performing convolution on the source feature map using a convolution kernel. N refers to a square of a magnification factor of the source feature map.

For example, if the feature map magnification network is to magnify the source feature map by a factor of 2, the magnification factor is 2. For each source position in the source feature map, 2*2=4 reassembly kernels may be obtained. The "one source position" may be one pixel in the source feature map.

The reassembly kernels are obtained by performing convolution for the contents of different positions in the source feature map using the content encoding convolution layer. Therefore, the reassembly kernels may change along with the change of the contents of different positions in the source feature map.

At block 204, the normalized reassembly kernel is obtained by performing normalization for each reassembly kernel.

At this block, each reassembly kernel may include a plurality of features. A plurality of features belonging to the same reassembly kernel may be normalized to ensure that a feature sum of each reassembly kernel is 1. Since the reassembly kernel is normalized, a feature average value of the source feature map will not be changed when the source feature map is magnified.

After normalization, the normalized reassembly kernel may be applicable to feature reassembly of the reassembling module 12.

At block 206, for each source position in the source feature map, N reassembly features corresponding to the source position are obtained by reassembling the features of a reassembly region determined according to the source position using N normalized reassembly kernels corresponding to the source position.

After the above blocks, each source position in the source feature map may correspond to N reassembly kernels, and each of reassembly kernels are normalized.

At this block, performing feature reassembly for any source position in the source feature map includes the following processing.

Firstly, the reassembly region with the source position as a center is obtained, where the reassembly region and the reassembly kernel are of equal size. For example, if the size of the reassembly kernel is 5*5, the size of the reassembly region is also 5*5.

Next, feature reassembly is performed for the reassembly region determined according to the source position with N normalized reassembly kernels corresponding to the source position respectively. One reassembly kernel may correspond to one reassembly feature, and thus N reassembly features may be totally obtained.

At block 208, the target feature map is generated according to N reassembly features corresponding to each source position in the source feature map.

At this block, the N reassembly features corresponding to the source position obtained at block 206 may be padded in a target position that is in the target feature map and corresponds to the source position. The target position has a larger area than the source position.

Figure 4:
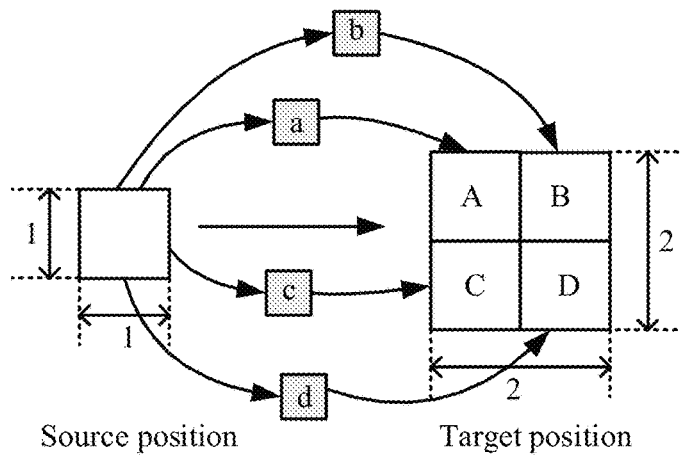
FIG. 4 is a diagram illustrating a principle of magnification of a source feature map according to at least one example of the present disclosure.

For example, if the source feature map is magnified by a factor of 2, one pixel in the source feature map may correspond to four pixels in the target feature map. As shown in FIG. 4, the height and the width of the magnified target position are both twice the height and the width of the source position. One pixel of the source position may correspond to four reassembly kernels a, b, c and d (FIG. 4 is only illustrative, and the actual size of the reassembly kernel may be greater than the size of the source position). Four reassembly features are totally obtained by performing feature reassembly for the reassembly region corresponding to the source position using the four reassembly kernels respectively. For example, one reassembly feature is obtained by performing feature reassembly for the reassembly region using the reassembly kernel a, and another reassembly feature is obtained by performing feature reassembly for the reassembly region using the reassembly kernel b. The four reassembly features are padded in four regions A, B, C and D of the target position to complete magnification of the source position to the target position.

The above process of block 206 and block 208 are performed for each source position in the source feature map to achieve the magnification of the source feature map to the target feature map. When the source position is located at an edge of the source feature map, a part that is in the reassembly region and goes beyond the source feature map may be padded with 0.

For example, in combination with FIG. 2, shape parameters of the target feature map may be C*σH*σW, where C refers to the number of channels in the target feature map, σH refers to a height, σW refers to a width, and σ refers to a magnification factor of the source feature map to the target feature map. $x^2$ may be an identifier of the target feature map.

At block 210, the prediction result of the sample image is obtained according to the target feature map.

At this block, the neural network where the feature map magnification network is located may obtain a prediction result corresponding to the sample image through prediction according to the target feature map. The prediction result may vary depending on different specific scenarios of the neural network. For example, the prediction result may be a class of an object, or a class of a particular pixel in the sample image, or the like.

At block 212, the parameters of the neural network are adjusted based on a difference between a labeled result and the prediction result of the sample image. The parameters of the neural network include parameters of the content encoding convolution layer in the feature map magnification network.

At this block, the neural network where the feature map magnification network is located may adjust the parameters of the neural network through backpropagation according to the difference between the labeled result of the sample image and the prediction result of the sample image obtained based on the target feature map. The feature map magnification network is a part of the neural network, and the parameters of the content encoding convolution layer included in the kernel prediction module in the feature map magnification network may also be adjusted during training.

According to the training method of the feature map magnification network in this example, the reassembly kernels corresponding to different positions are obtained by performing convolution according to the contents of the different positions in the source feature map. Therefore, different reassembly kernels corresponding to different positions are obtained even for the same source feature map. In other words, different from a traditional method in which the same kernel is adopted for all positions in the same source feature map, the reassembly kernels obtained in the examples, by perceiving the contents of the position in the source feature map, corresponds to the position in the source feature map. Therefore, when the reassembly kernel is used to reassemble feature for the source feature map, the contents in the source feature map are fully utilized, and therefore, the feature map may be magnified at a higher accuracy rate, thus improving the performance of magnifying feature map.

Figure 5:
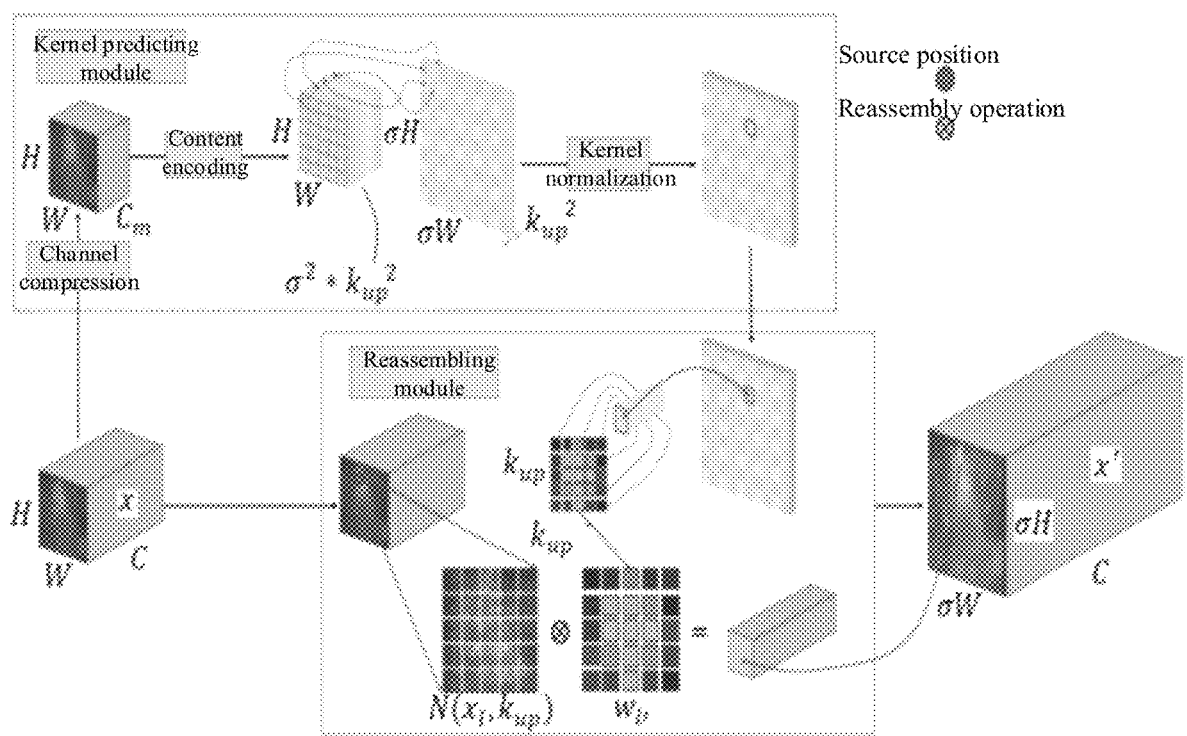
FIG. 5 illustrates another method of magnifying a feature map according to at least one example of the present disclosure.

FIG. 5 illustrates, in more details, a process in which the feature map magnification network magnifies the source feature map to the target feature map. Based on FIG. 2, FIG. 5 illustrates some process for optimizing the performance of magnifying feature map, and describes exemplary practical process for different processing blocks of magnifying feature map. In FIG. 5, the kernel prediction module and the reassembling module both are components of the feature map magnification network. The source feature map and the target feature map in FIG. 5 are same as those in FIG. 2.

Processing of the Kernel Prediction Module

As shown in FIG. 5, the kernel prediction module may firstly perform channel compression for the input source feature map (e.g., performed by a channel compressor). Specifically, channel compression may be performed for the source feature map by a channel compression convolution layer. The channel compression convolution layer may be a convolution layer of 1*1.

If the number of channels of the input source feature map is C, the number of output channels may be $C_m$ after the input source feature map is processed by the channel compression convolution layer, where $C_m$<C. By performing channel compression for the source feature map, the efficiency of the algorithm of the feature map magnification may be improved, and the CARAFE algorithm of the present disclosure may aggregate content information in a larger receptive field scope of the source feature map, thereby further improving the algorithm performance. Experiments show that channel compression will not damage the performance of the algorithm.

In addition, after the kernel prediction module is added with the channel compression convolution layer, the parameters of the neural network adjusted during training include not only the above parameters of the content encoding convolution layer, but also the parameters of the channel compression convolution layer.

With continuous reference to FIG. 5, convolution is performed for the channel-compressed source feature map by the content encoding convolution layer of the kernel prediction module (e.g., performed by a content encoder).

Figure 6:
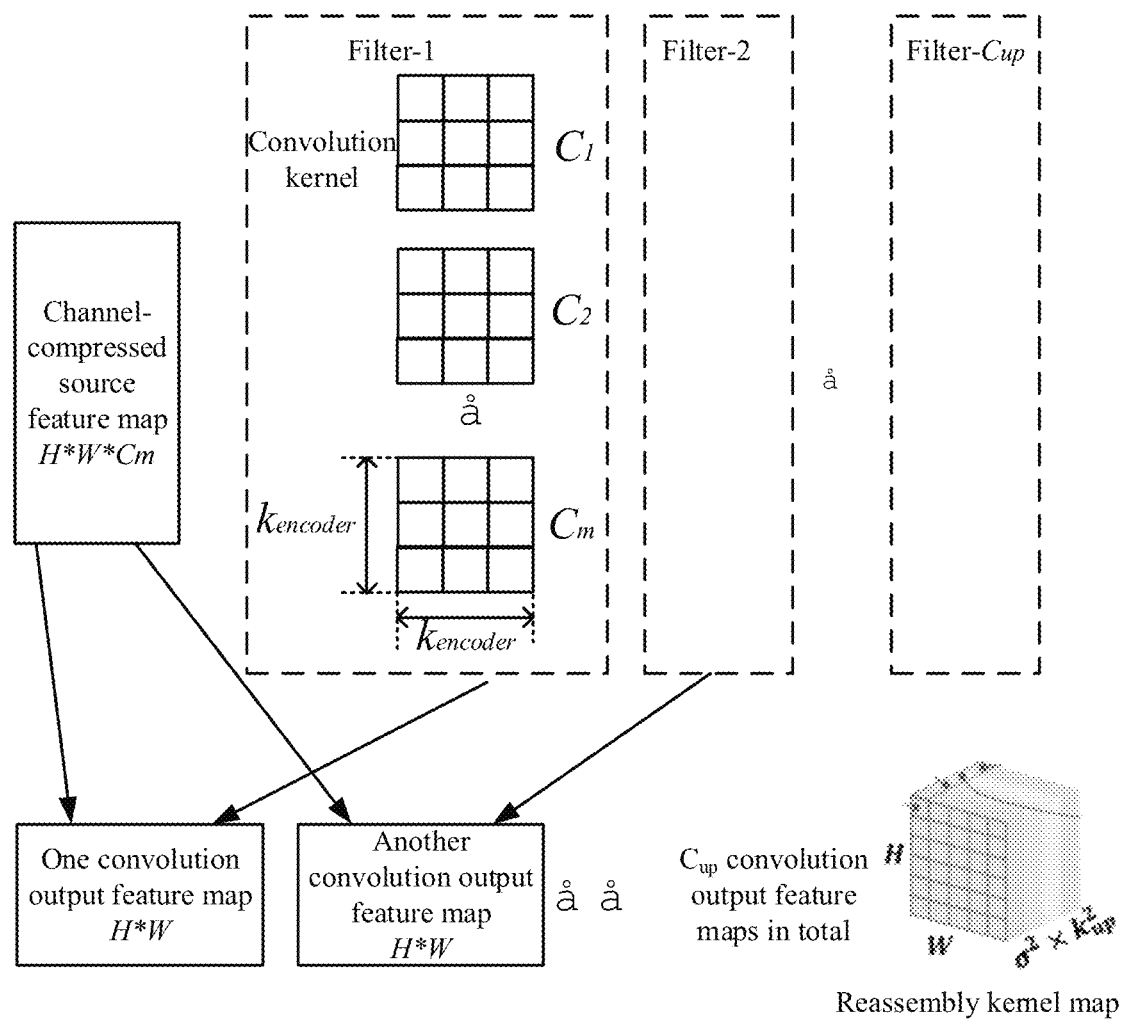
FIG. 6 is a diagram illustrating a principle of generation of a reassembly kernel map according to at least one example of the present disclosure.

As shown in FIG. 6, the content encoding convolution layer includes $\sigma^2 * k_{up} = C_{up}$ filters, where $\sigma^2$ refers to a square of a magnification factor of the source feature map, and $k_{up}^2$ refers to a size of one reassembly kernel. Each filter includes $C_m$ convolution kernels, and a size of each convolution kernel is $k_{encoder} * k_{encoder}$. When convolution is performed, a convolution output feature map of one channel is obtained by performing convolution on the source feature map with each filter, where a size of the convolution output feature map is H*W. The content encoding convolution layer may totally obtain convolution output feature maps with $C_{up}$ channels. As shown in FIG. 6, reassembly kernel maps with $H*W*\sigma^2*k_{up}^2$ which may also be referred to as reassembly kernel maps with $C_{up}$ channels, are obtained through convolution. In the reassembly kernel map, each layer is one channel and is referred to as one convolution output feature map.

After the reassembly kernel map is obtained, obtaining N reassembly kernels corresponding to each position in the source feature map is continued as follows.

Firstly, one convolution output feature map may include many pixels, and the feature of each pixel may be referred to as one convolution output feature. For example, FIG. 7 illustrates one convolution output feature 61 (corresponding to one square in FIG. 7) and another convolution output feature 62 in the convolution output feature map.

Figure 7:
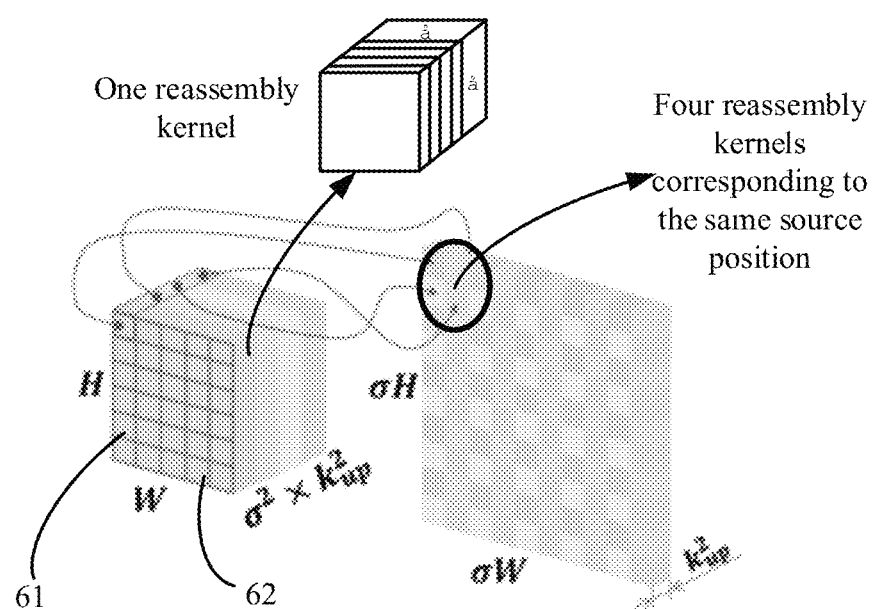
FIG. 7 is a diagram illustrating transformation of a reassembly kernel map according to at least one example of the present disclosure.

Next, with continuous reference to FIG. 7, a depth of the reassembly kernel map is $\sigma^2 * k_{up}^2$, that is, each position (e.g., each pixel) in the source feature map corresponds to convolution output features in $\alpha^2 * k_{up}^2$ channels. When the magnification factor of the source feature map is σ, the height of the target feature map is σH and the width of the target feature map is σW. In this case, the depth of the reassembly kernel map may be changed to $k_{up}^2$. Specifically, the reassembly kernel map of $\sigma^2 * k_{up}^2$ channels may be equally segmented into $N=\sigma^2$ parts in a depth direction. In FIG. 7, the magnification factor is 2, and the reassembly kernel map is equally divided into 4 parts, with each part including the number of channels $k_{up}^2$. Each part may be referred to as one reassembly kernel, and the reassembly kernel includes $k_{up}^2$ channels of convolution output features.

In addition, in FIG. 7, after the reassembly kernel map is equally divided in the depth direction, adjacent channels are combined together to form one reassembly kernel. An actual implementation is not limited hereto. Different channels in the depth direction may be combined arbitrarily as long as the number of channels is finally combined into N equal parts. However, it is required to ensure that the channels corresponding to different pixels of the source feature map are combined in a same way. For example, there are four channels 0 to 3. If the channel 0 and the channel 2 are taken as one group and the channel 1 and the channel 3 are taken as one group, all pixels are to be grouped like this.

N corresponding reassembly kernels may be obtained for each source position in the source feature map through the above processing of the content encoding convolution layer. In addition, experiments show that when the size of the convolution kernel is $k_{encoder} * k_{encoder}$ and the size of the reassembly kernel is $k_{up} * k_{up}$, $k_{encoduer}$ is set to $k_{up}$ minus 2 so that the balance between "perception of the larger receptive field" and "improvement of the algorithm efficiency" may be achieved well. Of course, the values of $k_{encoduer}$ and $k_{up}$ in the actual implementation are not limited in this example. However, the receptive field of the convolution kernel may be expanded by increasing $k_{encoder}$, so that the contents of the source feature map in a larger regional scope may be perceived and the obtained corresponding reassembly kernels have better effect in magnification of the feature map.

With continuous reference to FIG. 5, normalization may be performed for each reassembly kernel (e.g., by kernel normalizer) after the reassembly kernel corresponding to each source position in the source feature map is obtained. As described above, each reassembly kernel may include convolution output features in $k_{up}^2$ channels, and these convolution output features may be normalized. The specific normalization method is not limited in this example. For example, normalization may be performed by a softmax function.

Ater the reassembly kernels of each source position in the source feature map are obtained and normalized, the reassembling module may magnify the source feature map using the normalized reassembly kernels.

Processing of the Reassembling Module

Figure 8:
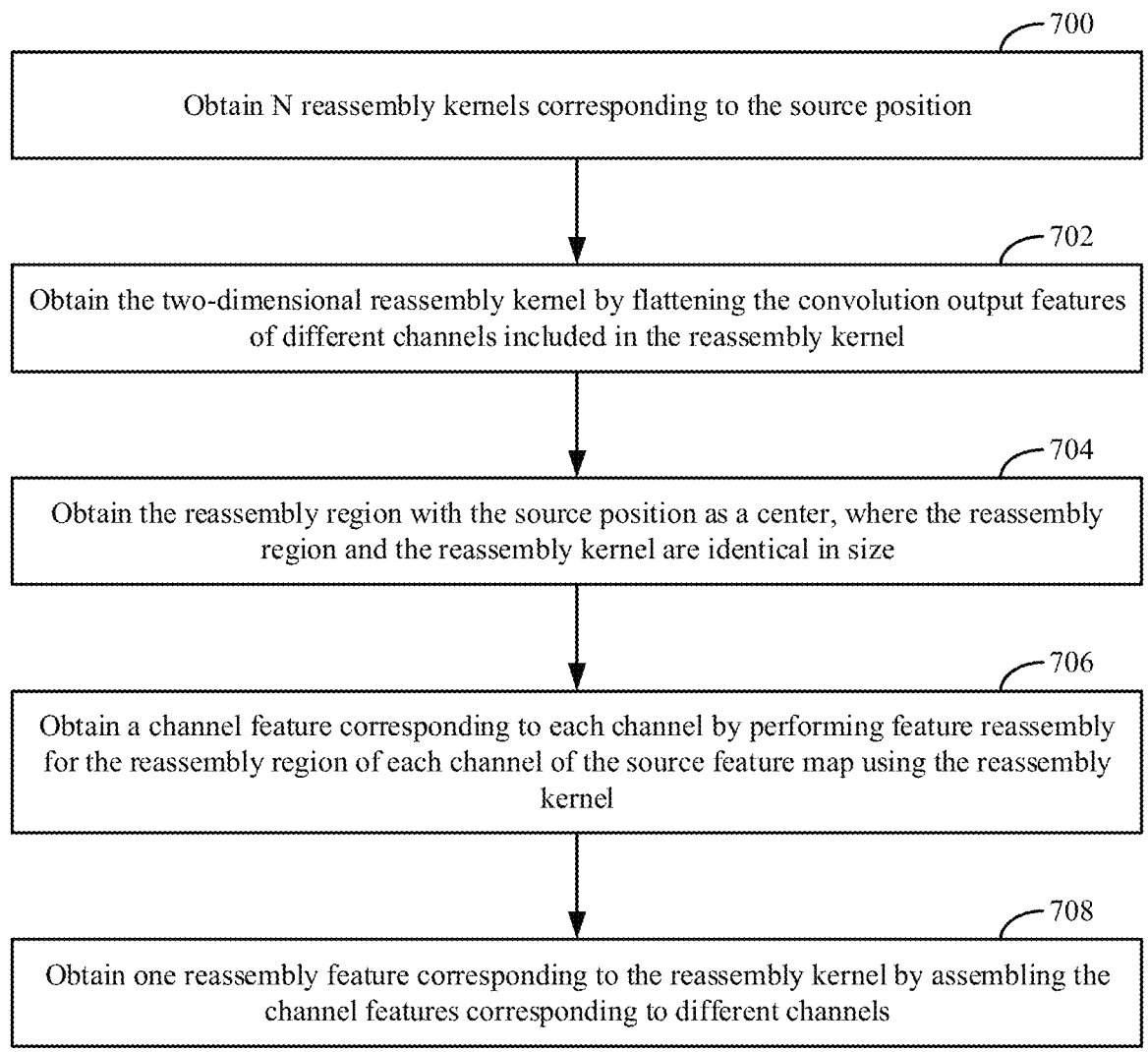
FIG. 8 is a flowchart illustrating a feature reassembly according to at least one example of the present disclosure.

With continuous reference to FIG. 5, when magnifying the source feature map, the reassembly modules may perform a processing for each source position in the source feature map shown in FIG. 8.

At block 700, N reassembly kernels corresponding to the source position are obtained. Blocks 702-708 are performed for any reassembly kernel.

At this block, the same source position corresponds to N reassembly kernels. For example, when the magnification factor is 2, N=4. In this case, one source position corresponds to four reassembly kernels. The corresponding reassembly feature may be obtained by reassembling the features of the reassembly region using each reassembly kernel.

At block 702, the two-dimensional reassembly kernel is obtained by flattening the convolution output features of different channels included in the reassembly kernel.

In FIG. 5, as described above, one reassembly kernel includes convolution output features in $k_{up}^2$ channels. These convolution output features may be flattened into one two-dimensional reassembly kernel with its size being $k_{up} * k_{up}$.

At block 704, the reassembly region with the source position as a center is obtained, where the reassembly region and the two-dimensional reassembly kernel are identical in size.

At this block, the reassembly region takes the source position as a center and its size is also $k_{up} * k_{up}$. In FIG. 5. $N(x_l, k_{up})$ refers to a feature reassembly function, for example, a weighted sum, which will be described subsequently. $x_l$ refers to a reassembly region with the source position $l(i,j)$ as the center, and $k_{up}$ refers to that the size of the reassembly region is also $k_{up} * k_{up}$.

7) At block 706, a channel feature corresponding to each channel is obtained by performing feature reassembly for the reassembly region of each channel of the source feature map using the two-dimensional reassembly kernel.

At this block, the number of channels in the source feature map is C. In an example, the source feature map without performing the channel compression is processed by the reassembly module. But the channel compression mentioned above is performed before convolution of the kernel prediction module so as to mainly expand the receptive field scope of the reassembly kernel generated based on the contents.

Figure 9:
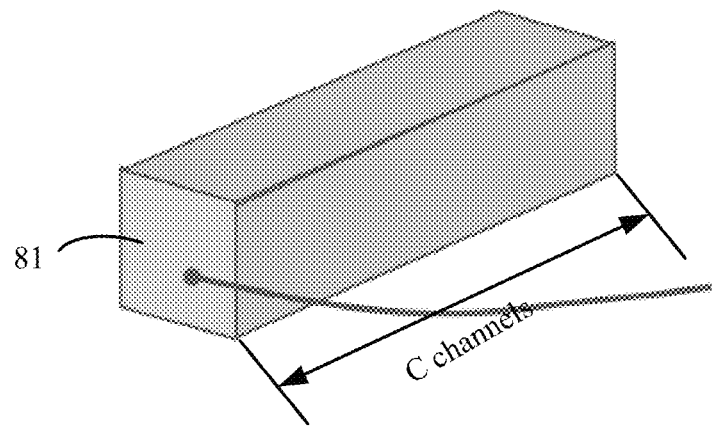
FIG. 9 is a schematic diagram illustrating generation of a reassembly feature according to at least one example of the present disclosure.

One corresponding channel feature may be obtained after feature reassembly is performed for the reassembly region of one channel in the source feature map using one reassembly kernel. FIG. 9 illustrates a channel feature 81 with its area corresponding to 1/N of the target position. For example, when the magnification factor is 2, the area of the channel feature 81 is equivalent to ¼ of the area of the target position. The channel features different channels are assembled together to form a cubic shape shown in FIG. 9, totaling C channels.

At this block, when feature assembly is performed for the reassembly region of one channel by using one reassembly kernel, the feature reassembly used herein includes but not limited to the following two methods.

For example, weighted summation may be performed for the reassembly kernel and the features of the corresponding position in the reassembly region, each convolution output feature in the reassembly kernel is taken as weight, and the weighted summation result is taken as the channel feature.

$$(x_l, k_{up}) = \sum_{n=-r}^{r} \sum_{m=-r}^{r} w_{l,(n,m)} \cdot x_{(i+n,j+n)} \quad (1)$$

In the above formula, $r=\lfloor k_{up}/2 \rfloor$, and $w_{l(n,m)}$ refers to any position on the reassembly kernel, for example, any square in the reassembly kernel w, in FIG. 5.

Generally, the convolution kernel of deconvolution is determined during training, and cannot be changed during a test. In other words, during the test, the determined convolution kernel is always used for magnifying the feature map no matter which image is input. In contrast, the reassembly kernel in the method of magnifying a feature map in the present disclosure is obtained by performing convolution according to the contents of the source feature map during the test, and different convolution results, i.e., reassembly kernels, may be obtained according to different feature map contents. Therefore, the method of the present disclosure may perform different reassembly operations according to the different contents of the image to be magnified during feature map magnification. Practices demonstrate that the method of magnifying a feature map in the present disclosure achieves a much better effect than deconvolution.

For another example, a convolution output feature with the maximum value may also be determined from a plurality of convolution output features of the reassembly kernel, and the feature of the reassembly region corresponding to the position of the convolution output feature with the maximum value may be obtained as the channel feature.

At block 708, one reassembly feature corresponding to the reassembly kernel is obtained by assembling the channel features corresponding to different channels. For example, FIG. 9 illustrates one reassembly feature including channel features of C channels.

Each reassembly kernel may obtain one reassembly feature, and therefore N reassembly kernels may obtain a total of N reassembly features. The N reassembly features corresponding to one source position may be padded in the target position that is in the target feature map and corresponds to the source position.

For example, similar to FIG. 4, four reassembly features may be padded in four regions A, B, C and D of the target position. An order of padding the four reassembly features in the four regions is not limited is this example as long as each pixel is padded in the same order. The target position in the target feature map may be determined according to a correspondence between the source position and the target position and the magnification factor.

For example, each position l'(i',j') in the target feature map corresponds to the position l'(i',j') in the source feature map, where $$i = \left\lfloor \frac{i'}{\sigma} \right\rfloor, j = \left\lfloor \frac{j'}{\sigma} \right\rfloor,$$

and σ refers to a magnification factor. Similar to FIG. 4, one source position in the source feature map corresponds to one target position in the target feature map, and a regional area of the target position is $\sigma^2$ times a regional area of the corresponding source position.

The source feature map may be magnified to the target feature map by performing the above operations for each source position in the source feature map.

After the training of the feature map magnification network is completed, the feature map magnification network may be used in any feature magnification. For example, the feature map magnification network may be integrated in an existing neural network (e.g., FPN), and the feature magnification used in the neural network may be replaced with the feature map magnification network in this example.

As described above, when the feature map magnification network is integrated in the neural network, the feature map magnification network integrated in the neural network may be trained by training the neural network.

Network Application

Figure 10:
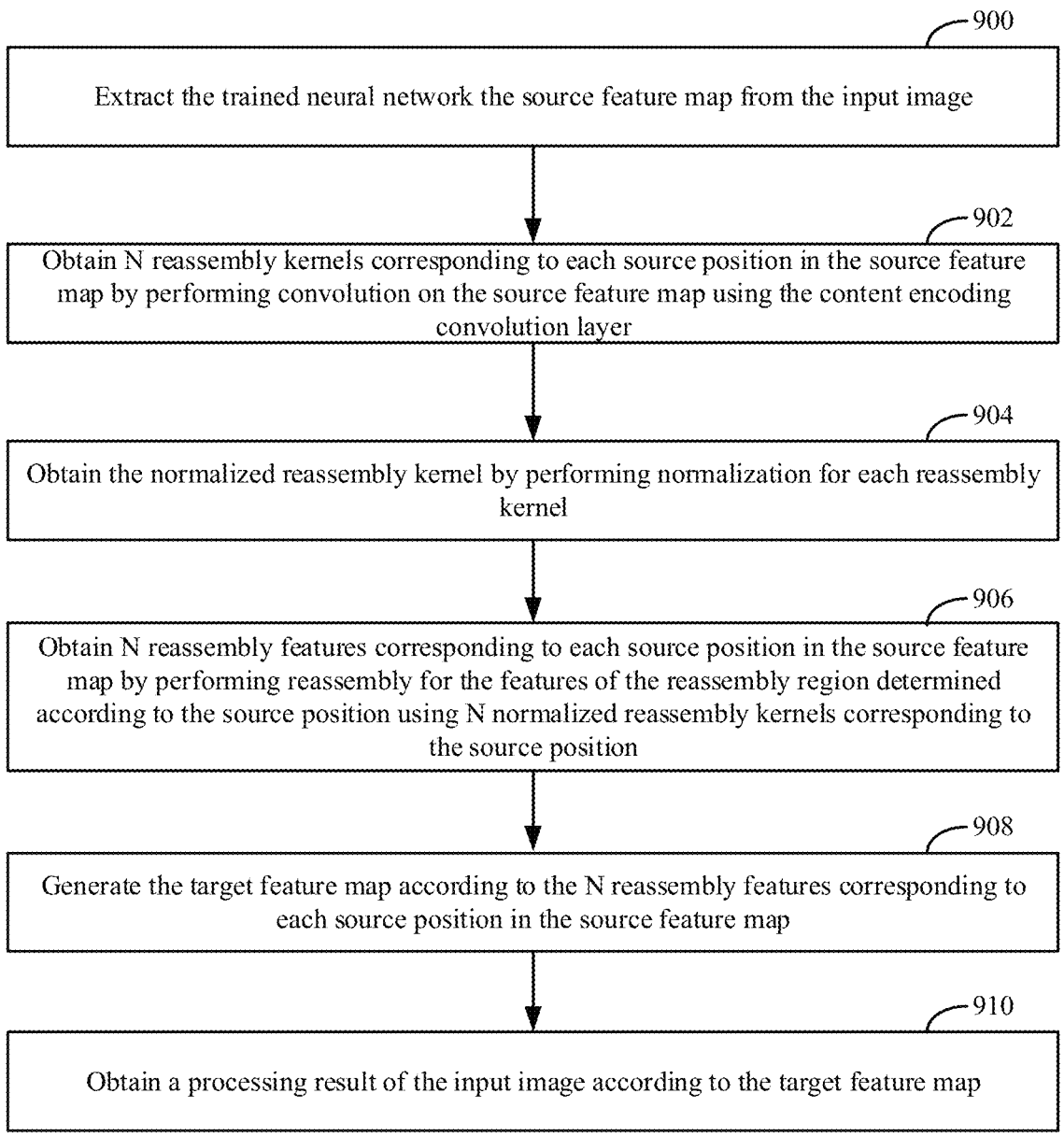
FIG. 10 is a flowchart illustrating a method of magnifying a feature map applicable to a trained neural network according to at least one example of the present disclosure.

The feature map may be magnified using the feature map magnification network described in any above example of the present disclosure. For example, FIG. 10 illustrates a method of magnifying a feature map in an example. In the method, a trained neural network extracts a source feature map from an input image and performs relevant processing following the magnification of the source feature map. As shown in FIG. 10, the method may include the following blocks.

At block 900, the trained neural network extracts the source feature map from the input image.

The trained neural network includes the content encoding convolution layer trained by the method in any example of the present disclosure.

The source feature map may be obtained by directly performing feature extraction on the input image using the neural network. In addition, the neural network may further include a plurality of feature map magnification networks to magnify the extracted source feature map several times. For example, if the source feature map is to be magnified by a factor of 4 and the trained feature map magnification network may magnify the source feature map by a factor of 2 at one time, the feature map magnification network may be used twice continuously. In other words, the feature map magnification network may firstly magnify the source feature map by a factor of 2, and then magnify it by a factor of 2 again.

At block 902, N reassembly kernels corresponding to each source position in the source feature map are obtained by performing convolution on the source feature map using the content encoding convolution layer.

At this block, the content encoding convolution layer in the trained neural network may be used to perform convolution for the source feature map. In another example, the channel compression convolution layer in the trained neural network may perform channel compression for the source feature map before the content encoding convolution layer may perform convolution for the channel-compressed source feature map.

As the parameters of the trained neural network are already determined, the parameters of the feature map magnification network integrated in the trained neural network are also determined, and the parameters of the content encoding convolution layer and the parameters of the channel compression convolution layer in the feature map magnification network are also determined.

At block 904, the normalized reassembly kernel is obtained by performing normalization for each reassembly kernel.

At block 906, N reassembly features corresponding to each source position in the source feature map are obtained by reassembling the features of the reassembly region determined according to the source position with N normalized reassembly kernels corresponding to the source position.

At block 908, the target feature map is generated according to the N reassembly features corresponding to each source position in the source feature map.

At block 910, a processing result of the input image is obtained according to the target feature map.

Several examples of obtaining the processing result by the neural network according to the target feature map are described below.

For example, in a neural network for object detection, the input image may include at least one target object to be detected. The neural network may firstly obtain the source feature map by extracting features of the input image. Next, the neural network may obtain the target feature map subsequent to the magnification of the source feature map by the feature map magnification network. Then, the neural network may continue the processing according to the target feature map to output a bounding box of each target object and a probability of the class to which the target object belongs in the input image.

For another example, in a neural network for image repair, the input image may include a missing part, and the neural network may firstly obtain the source feature map by extracting the features of the input image through its backbone network. Next, the neural network may obtain the target feature map subsequent to the magnification of the source feature map by the feature map magnification network. Then, the neural network may continue the processing according to the target feature map so as to output pixels of the missing part in the input image.

For still another example, in a neural network for semantic prediction, the feature map magnification network included in the neural network may magnify the source feature map extracted from the input image to obtain the target feature map subsequent to the magnification, and may continue the processing according to the target feature map to output a class to which each pixel belongs in the input image.

For yet another example, in a neural network for instance segmentation, the feature map magnification network included in the neural network may magnify the source feature map extracted from the input image to obtain the target feature map subsequent to the magnification, and may continue the processing according to the target feature map to output each instance and the class of each pixel in the instance in the input image.

Figure 11:
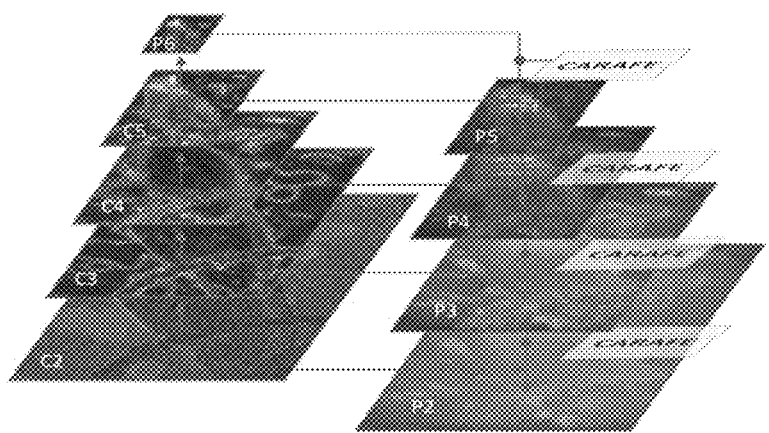
FIG. 11 is a schematic diagram illustrating an FPN network structure according to at least one example of the present disclosure.

The above feature map magnification algorithm according to the examples of the present disclosure may be referred to as CARAFE algorithm. An application scenario of the CARAFE is a feature pyramid network (FPN) with its structure shown in FIG. 11. In the FPN, a plurality of layers of features (c2, c3, c4 and c5) of an input image are firstly obtained. Each layer of features is reduced in size by a factor of 2 sequentially from the feature c2.

The FPN obtains p6 by down sampling c5 (e.g., max pool and average pool). Then, the FPN transfers each layer of features to an upper layer of features sequentially. In a transfer process, a smaller feature map is magnified by a factor of 2 and then added to a larger feature map.

In the standard FPN, the above magnification is realized by using nearest neighbor interpolation. In the FPN with the CARAFE, the nearest neighbor interpolation is directly replaced with the CARAFE, and the parameters of the CARAFE and the parameters of the FPN are optimized simultaneously during training.

A main application scenario of the FPN is FasterRCNN in an object detection task. The FPN with the CARAFE is compared with the original FPN on the FasterRCNN. For MSCOCO 2017 dataset, an official MSCOCO evaluation standard, that is, a mean average precision (mAP) value from intersection-over-union (IoU) 0.5 to 0.95 is employed. The IoU refers to area intersection/area union between a bounding box and a target box; mAP refers to mean of each class of average precision over different classes with the full score being 100, and the minimum score being 0; further, for each target box, when at least one bounding box successfully detects the class of the target box and the IoU with the target box is greater than a specific threshold, it is considered that the object is detected. For a test set (test-dev), the CARAFE may increase the algorithm precision from 36.9 to 38.1. The experiment shows that the CARAFE used in the FPN structure may significantly increase the algorithm precision of the FasterRCNN.

Other application instances of the CARAFE will not be enumerated any more herein. In an actual experiment, the CARAFE algorithm has a low computing resource overhead and a high operation speed, and thus may be easily integrated in the network structure for several tasks such as an object detection task, an image repair task, a semantic segmentation task and an instance segmentation task. Further, by evaluating the performance of the CARAFE algorithm in a plurality of tasks, the algorithm enables each task to have consistent and stable performance improvement.

Figure 12:
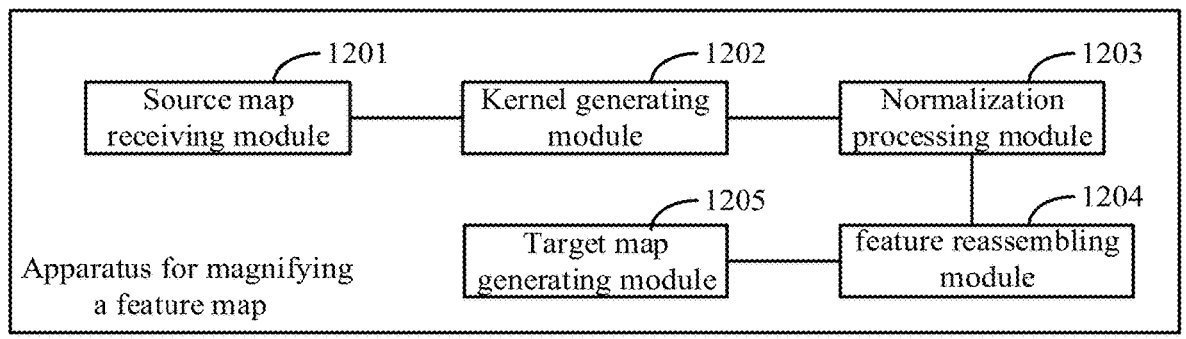
FIG. 12 is a block diagram illustrating an apparatus for magnifying a feature map according to at least one example of the present disclosure.

FIG. 12 provides an apparatus for magnifying a feature map. As shown in FIG. 12, the apparatus may include a source map receiving module 1201, a kernel generating module 1202, a normalization processing module 1203, a feature reassembling module 1204 and a target map generating module 1205.

The source map receiving module 1201 is configured to receive a source feature map to be magnified, where the source feature map may be obtained by performing feature extraction on an input sample image; the kernel generating module 1202 is configured to obtain N reassembly kernels corresponding to each source position in the source feature map by performing convolution on the source feature map, where N refers to a square of a magnification factor of the source feature map; the normalization processing module 1203 is configured to obtain a normalized reassembly kernel by performing normalization for each reassembly kernel; the feature reassembling module 1204 is configured to obtain N reassembly features corresponding to each source position in the source feature map by reassembling features of a reassembly region determined according to the source position using N normalized reassembly kernels corresponding to the source position; the target map generating module 1205 is configured to generate a target feature map according to the N reassembly features corresponding to each source position in the source feature map.

In an example, the kernel generating module 1202 may be configured to: obtain reassembly kernel maps with $C_{up}$ channels by performing convolution on the source feature map with $C_{up}$ filters, where $C_{up}$ is determined according to the magnification factor and a size of the reassembly kernel; and for each source position in the source feature map, divide convolution output features in the reassembly kernel maps with the $C_{up}$ channels that correspond to the source position into N equal parts, wherein each of the parts is taken as one of the reassembly kernels corresponding to the source position and comprises convolution output features in $C_{up}/N$ channels.

In an example, the feature reassembling module 1204 may be further configured to: obtain a two-dimensional reassembly kernel by flattening the convolution output features in the $C_{up}/N$ channels included in each reassembly kernel corresponding to the source position before the features of the reassembly region are reassembled with N normalized reassembly kernels corresponding to the source position; and obtain the reassembly region with the source position as a center, where the reassembly region and the reassembly kernel are of equal size.

In an example, the normalization processing module 1203 may be configured to obtain the normalized reassembly kernel by performing normalization for the convolution output features of $C_{up}/N$ channels in each reassembly kernel.

In an example, when the feature reassembling module 1204 obtains N reassembly features corresponding to one source position by reassembling the features of the reassembly region using N normalized reassembly kernels corresponding to the source position; the feature reassembling module 1204 may be configured to, for each reassembly kernel of the N normalized reassembly kernels, obtain each channel of features corresponding to the reassembly kernel by performing feature reassembly with respect to the reassembly kernel and the reassembly region for one channel of the source feature map respectively; and obtain a reassembly feature corresponding to the reassembly kernel by assembling each channel of features corresponding to the reassembly kernel.

In an example, when the feature reassembling module 1204 obtains the channel features of different channels corresponding to the reassembly kernel by performing reassembly for the reassembly region of each channel of the source feature map using the reassembly kernel respectively; the feature reassembling module 1204 may be configured to, for each channel of the source feature map, perform weighted summation for the reassembly kernel and on the channel features at corresponding positions in the reassembly region, and take a result of the weighted summation as the channel of features corresponding to the reassembly kernel.

In an example, the target map generating module 1205 may be configured to: determine a target position in the target feature map that corresponds to the source position according to the source position and the magnification factor; and pad N reassembly features into the target position in the target feature map that corresponds to the source position.

Figure 13:
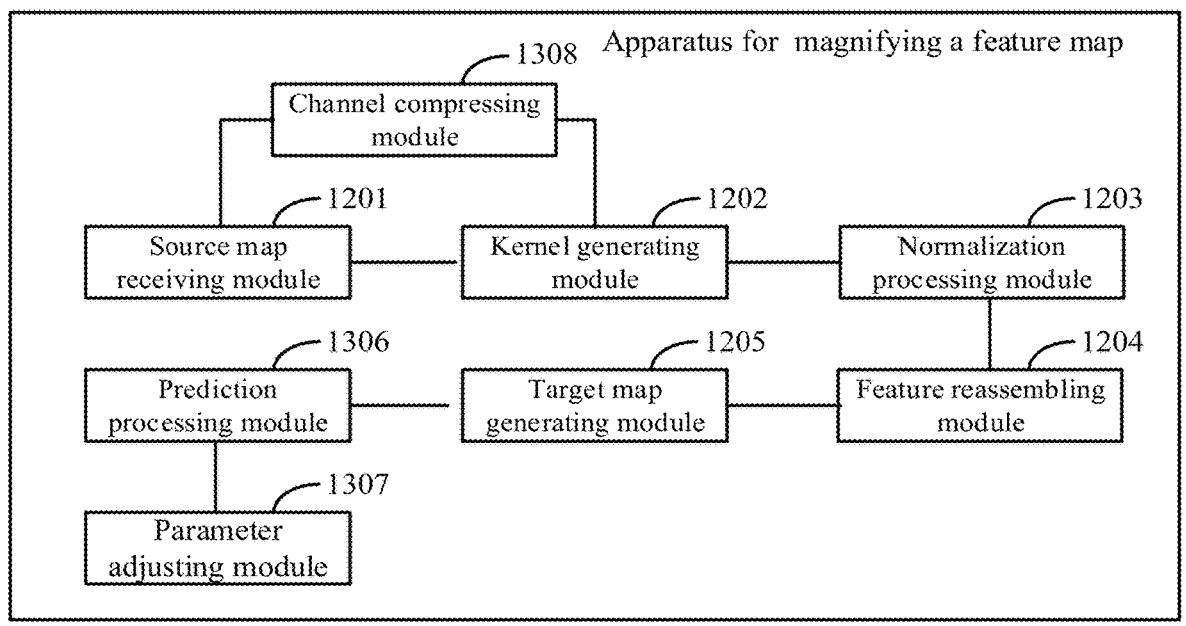
FIG. 13 is a block diagram illustrating another apparatus for magnifying a feature map according to at least one example of the present disclosure.

In an example, as shown in FIG. 13, when the apparatus for magnifying a feature map in FIG. 12 is involved in a to-be-trained neural network, the apparatus may further include a prediction processing module 1306 and a parameter adjusting module 1307.

In this case, the source feature map received by the source map receiving module 1201 may be obtained by performing feature extraction on the input sample image using the to-be-trained neural network; when performing convolution on the source feature map, the kernel generating module 1202 may be configured to perform convolution for the source feature map by a content encoding convolution layer in the to-be-trained neural network.

The prediction processing module 1306 is configured to obtain a prediction result of the sample image according to the target feature map after the target map generating module 1205 generates the target feature map; the parameter adjusting module 1307 is configured to adjust parameters of the to-be-trained neural network based on a difference between a labeled result and the prediction result of the sample image, where the parameters of the to-be-trained neural network include parameters of the content encoding convolution layer.

In an example, as shown in FIG. 13, the apparatus further includes a channel compressing module 1308 configured to perform channel compression for the source feature map by a channel compression convolution layer in the to-be-trained neural network. In this case, when performing convolution on the source feature map, the kernel generating module 1202 may be configured to perform convolution for the channel-compressed source feature map by the content encoding convolution layer. In addition, the parameter adjusting module 1307 is further configured to adjust parameters of the channel compression convolution layer based on the difference of the labeled result and the prediction result of the sample image.

Figure 14:
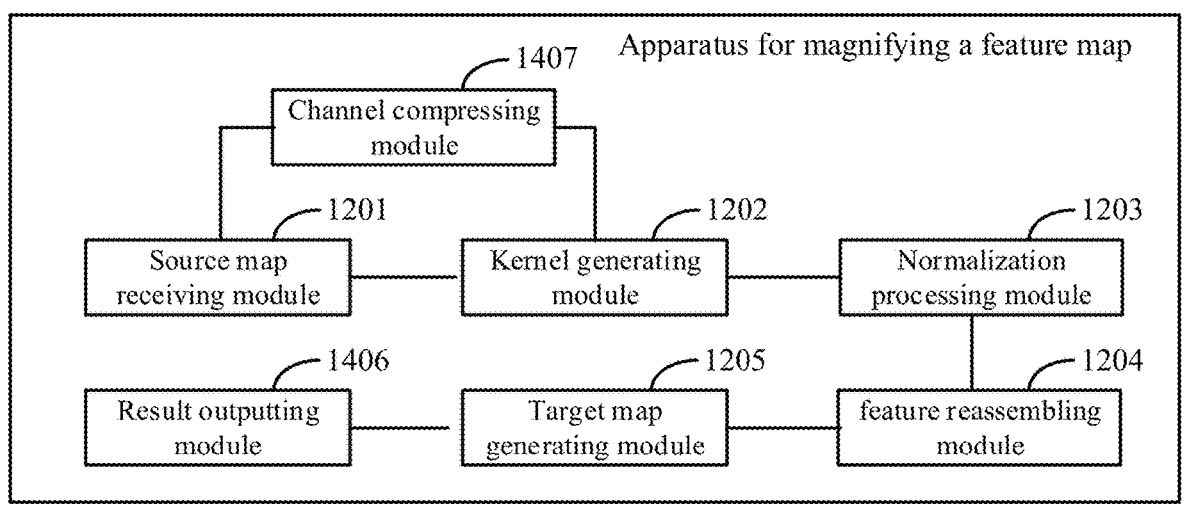
FIG. 14 is a block diagram illustrating still another apparatus for magnifying a feature map according to at least one example of the present disclosure.

In an example, as shown in FIG. 14, when the apparatus for magnifying a feature map in FIG. 12 is involved in a trained neural network, the source feature map received by the source map receiving module 1201 may be obtained by performing feature extraction for the input sample image by the trained neural network; when performing the convolution for the source feature map, the kernel generating module 1202 may be configured to perform convolution for the source feature map by a content encoding convolution layer in the trained neural network. In addition, the apparatus may further include a result outputting module 1406 configured to obtain a processing result of the input image according to the target feature map after the target map generating module 1205 generates the target feature map.

In an example, as shown in FIG. 14, the apparatus may further include a channel compressing module 1407 configured to perform channel compression for the source feature map by a channel compression convolution layer in the trained neural network. In this case, when performing convolution on the source feature map, the kernel generating module 1202 may configured to perform convolution for the channel-compressed source feature map by the content encoding convolution layer.

In an example, the input image includes at least one target object to be detected; the result outputting module 1406 is configured to output a bounding box of each target object and a class of the target object in the input image according to the target feature map.

In an example, the input image includes a missing part; the result outputting module 1406 is configured to output pixels of the missing part of the input image according to the target feature map.

In an example, the result outputting module 1406 is configured to output each instance in the input image and a class of each pixel in each instance in the input image according to the target feature map.

In an example, the result outputting module 1406 is configured to output the class of each pixel in the input image according to the target feature map.

The present disclosure further provides a device for magnifying a feature map. The device includes a memory and a processor. The memory stores computer readable instructions operable by the processor, and the processor executes the computer readable instructions to implement the method of magnifying a feature map according to any example of the present disclosure.

The present disclosure further provides a non-transitory computer readable storage medium storing computer programs, and the programs are executed by the processor to implement the method of magnifying a feature map according to any example of the present disclosure.

The persons skilled in the art should understand that one or more examples of the present disclosure may be provided as methods, systems, or computer program products. Thus, one or more examples of the present disclosure may be implemented in the form of entire hardware examples, entire software examples or examples combining software and hardware. Further, one or more examples of the present disclosure may be implemented in the form of computer program products that are operated on one or more computer available storage media (including but not limited to magnetic disk memory. CD-ROM, and optical memory and so on) including computer available program codes.

An example of the present disclosure further provides a non-transitory computer readable storage medium storing computer programs. The programs are executed by the processor to implement blocks of a method of training a neural network for text recognition described in any example of the present disclosure and/or implement blocks of a text recognition method described in any example of the present disclosure. The "and/or" refers to at least one of two. For example. "N and/or B" includes three options: N. B and "N and B".

Different examples in the present disclosure are described in a progressive manner. Each example focuses on the differences from other examples with those same or similar parts among the examples to be referred to each other. Particularly, since the data processing device examples are basically similar to the method examples, the device examples are briefly described with relevant parts referred to the descriptions of the method examples.

Specific examples of the present disclosure are described above. Other examples not described herein still fall within the scope of the appended claims. In some cases, the desired results may still be achieved by performing actions or blocks that are described in the claims in an order different from that in the examples. In addition, it is not necessary to perform the process depicted in the accompanying drawings in a specific order or successive order shown herein in order to achieve the desired result. In some examples, it is also conceivable or advantageous to perform multi-task processing and parallel processing.

Examples of the subject and functional operations described in the present disclosure may be achieved in the following: a digital electronic circuit, a tangible computer software or firmware, a computer hardware including a structure disclosed in the present disclosure and a structural equivalent thereof, or a combination of one or more of the above. The example of the subject described in the present disclosure may be implemented as one or more computer programs, that is, one or more modules in computer program instructions encoded on a tangible non-transitory program carrier for being executed by or controlling a data processing apparatus. Alternatively or additionally, the program instructions may be encoded on an artificially-generated transmission signal, such as a machine-generated electrical, optical or electromagnetic signal. The signal is generated to encode information and transmit it to an appropriate receiver so that the signal is executed by the data processing apparatus. The computer storage medium may be a machine readable storage device, a machine readable storage substrate, a random or serial access memory device, or a combination of one or more of the above.

The processing and logic flow described in the present disclosure may be executed by one or more programmable computers executing one or more computer programs to execute corresponding functions by operating based on input data and generating output. The processing and logic low may be further executed by a dedicated logic circuit, such as a field programmable gate array (FPGN) or an application specific integrated circuit (NSIC), and the apparatus may be further implemented as the dedicated logic circuit.

A computer appropriate for executing computer programs includes, for example, a general and/or dedicated microprocessor or any other type of central processing unit. Generally, the central processing unit receives instructions and data from a read-only memory and/or a random access memory. Basic components of the computer include a central processing unit for implementing or executing instructions and one or more memory devices for storing instructions and data. Generally, the computer further includes one or more mass storage devices for storing data such as magnetic disks, magneto-optical disks or optical disks, or the computer is operably coupled to the mass storage device to receive or send data from or to the mass storage device, or perform both operations. However, it is not necessary for the computer to have such device. In addition, the computer may be embedded into another device, such as a mobile phone, a personal digital assistant (PDN), a mobile audio or video player, a game console, a global positioning system (GPS) receiver, or a portable storage device such as a universal serial bus (USB) flash drive which are only several illustrative examples.

A non-transitory computer readable medium appropriate for storing computer program instructions and data includes all forms of non-volatile memories, media and memory devices, such as semiconductor memory devices (e.g., an Erasable Programmable Read-Only Memory (EPROM), an Electrically Erasable Programmable Read-Only Memory (EEPROM) and a flash memory device), magnetic disks (e.g., an internal hard disk or a removable disk), magneto-optical disks and CD ROM and DVI)-ROM disks. The processor and the memory may be supplemented by the dedicated logic circuit or incorporated into the dedicated logic circuit.

Although the present disclosure includes many specific implementation details, these implementation details should not be interpreted as limiting any disclosed scope or claimed scope, but mainly used to describe the features of specific examples of the present disclosure. Some features described in a plurality of examples of the present disclosure may also be implemented through combination in a single example. On the other hand, different features described in a single example may also be implemented separately in a plurality of examples or implemented with any appropriate sub-combination. In addition, although the features may act in some combinations as described above and are claimed initially in this way, one or more features from the claimed combination may be removed from the combination in some cases, and the claimed combination may point to the sub-combination or a variation of the sub-combination.

Similarly, although the operations are described in a specific order in the drawings, it should not be understood that these operations are to be performed in a specific order or sequentially or all operations illustrated herein are to be performed so as to achieve a desired result. In some cases, multi-task processing and parallel processing may be advantageous. In addition, it shall not be understood that those system modules and components separated in the above examples shall be separated in all examples. It should be understood that the described program components and systems usually may be integrated into a single software product or packaged in a plurality of software products.

Therefore, the specific examples of the subject matter are already described. Other examples still fall within the scope of the appended claims. In some cases, the actions described in the claims may be performed in a different order in order to achieve the desired result. In addition, processing described in the drawings do not require a specific order or sequence shown herein to achieve the desired result. In some implementations, multi-task processing and parallel processing may be advantageous.

The foregoing disclosure is merely illustrative of preferred examples in one or more examples of the present disclosure and not intended to limit one or more examples of the present disclosure. Any modifications, equivalent substitutions and improvements made within the spirit and principles of one or more examples of the present disclosure shall all be encompassed in the scope of protection of one or more examples of the present disclosure.

The invention claimed is:

1. A method of magnifying a feature map, comprising:
   receiving a source feature map to be magnified;
   obtaining N reassembly kernels corresponding to each source position in the source feature map by performing convolution on the source feature map, wherein N refers to a square of a magnification factor of the source feature map;
   obtaining, for each of the reassembly kernels, a normalized reassembly kernel by performing normalization;

obtaining, for each source position in the source feature map, N reassembly features corresponding to the source position by reassembling features of a reassembly region determined according to the source position with N normalized reassembly kernels corresponding to the source position; and generating a target feature map according to the N reassembly features corresponding to each source position in the source feature map.

2. The method according to claim 1, wherein performing convolution for the source feature map comprises:

obtaining reassembly kernel maps with $C_{up}$ channels by performing convolution on the source feature map with $C_{up}$ filters, wherein $C_{up}$ is determined according to the magnification factor and a size of the reassembly kernel; and for each source position in the source feature map, dividing convolution output features in the $C_{up}$ channels that correspond to the source position into N equal parts, wherein each of the parts is taken as one of the reassembly kernels corresponding to the source position and comprises convolution output features in $C_{up}/N$ channels.

3. The method according to claim 2, further comprising:

obtaining, for each of the reassembly kernels corresponding to the source position, a two-dimensional reassembly kernel by flattening convolution output features in the $C_{up}/N$ channels comprised in the reassembly kernel; and obtaining the reassembly region with the source position as a center, wherein the reassembly region and the two-dimensional reassembly kernel are of an equal size.

4. The method according to claim 2, wherein obtaining, for each of the reassembly kernels, the normalized reassembly kernel by performing the normalization comprises:

obtaining the normalized reassembly kernel by performing normalization on the convolution output features in the $C_{up}/N$ channels in each of the reassembly kernel.

5. The method according to claim 1, wherein obtaining N reassembly features corresponding to the source position by reassembling features of the reassembly region with the N normalized reassembly kernels corresponding to the source position comprises:

for each reassembly kernel of the N normalized reassembly kernels, obtaining, channel features of each channel corresponding to the reassembly kernel by performing feature reassembly with respect to the reassembly kernel and the reassembly region for each channel of the source feature map respectively; and obtaining, a reassembly feature corresponding to the reassembly kernel by assembling channel features of each channel corresponding to the reassembly kernel.

6. The method according to claim 5, wherein obtaining channel features of each channel corresponding to the reassembly kernel by performing the feature reassembly with respect to the reassembly kernel and the reassembly region for each channel of the source feature map respectively comprises:

for each channel of the source feature map, performing weighted summation for the reassembly kernel and on features at corresponding positions in the reassembly region of the channel; and taking a result of the weighted summation as the channel features of the channel corresponding to the reassembly kernel.

7. The method according to claim 1, wherein generating the target feature map according to the N reassembly features corresponding to each source position in the source feature map comprises:

determining a target position in the target feature map that corresponds to the source position according to the source position and the magnification factor; and padding the N reassembly features into the target position in the target feature map.

8. The method according to claim 1, wherein, the source feature map is obtained by performing feature extraction on a sample image with a to-be-trained neural network, performing convolution on the source feature map comprises: performing convolution on the source feature map by a content encoding convolution layer in the to-be-trained neural network, and the method further comprises:

obtaining a prediction result of the sample image by the to-be-trained neural network according to the target feature map after the target feature map is generated; and adjusting parameters of the to-be-trained neural network based on a difference between a labeled result and the prediction result of the sample image, wherein the parameters of the to-be-trained neural network comprise parameters of the content encoding convolution layer.

9. The method according to claim 8, wherein:

the method further comprises: performing channel compression on the source feature map by a channel compression convolution layer in the to-be-trained neural network;

performing convolution on the source feature map by the content encoding convolution layer comprises: performing convolution on the channel-compressed source feature map by the content encoding convolution layer; and adjusting parameters of the to-be-trained neural network based on the difference between the labeled result and the prediction result of the sample image further comprises: adjusting parameters of the channel compression convolution layer based on the difference between the labeled result and the prediction result of the sample image.

10. The method according to claim 1, wherein:

the source feature map is obtained by performing feature extraction for an input image with a trained neural network;

performing convolution on the source feature map comprises: performing convolution on the source feature map by a content encoding convolution layer in the trained neural network; and the method further comprises: obtaining a processing result of the input image by the trained neural network according to the target feature map after the target feature map is generated.

11. The method according to claim 10, wherein:

the method further comprises: performing channel compression on the source feature map by a channel compression convolution layer in the trained neural network; and performing convolution on the source feature map by the content encoding convolution layer comprises: performing convolution on the channel-compressed source feature map by the content encoding convolution layer.

12. The method according to claim 10,
wherein: the input image comprises at least one target object to be detected; and obtaining the processing result of the input image according to the target feature map by the trained neural network comprises: outputting, by the trained neural network, a bounding box of each target object in the input image and a class of the target object according to the target feature map, or
wherein: the input image comprises a missing part; and obtaining the processing result of the input image by the trained neural network according to the target feature map comprises: outputting pixels of the missing part of the input image by the trained neural network according to the target feature map.

13. The method according to claim 10,
wherein obtaining the processing result of the input image by the trained neural network according to the target feature map comprises: outputting a class of each pixel in the input image by the trained neural network according to the target feature map, or
wherein obtaining the processing result of the input image by the trained neural network according to the target feature map comprises: outputting each instance of the input image and the class of each pixel in each instance of the input image by the trained neural network according to the target feature map.

14. A device for magnifying a feature map, comprising:
a processor, and
a memory storing computer readable instructions operable on the processor, and when executing the computer readable instructions, the processor is configured to:
receive a source feature map to be magnified;
obtain N reassembly kernels corresponding to each source position in the source feature map by performing convolution on the source feature map, wherein N refers to a square of a magnification factor of the source feature map;
obtain a normalized reassembly kernel by performing normalization for each reassembly kernel;
obtain N reassembly features corresponding to each source position in the source feature map by reassembling features of a reassembly region determined according to the source position using N normalized reassembly kernels corresponding to the source position; and
generate a target feature map according to the N reassembly features corresponding to each source position in the source feature map.

15. The device according to claim 14, wherein,
the device for magnifying the feature map is involved in a trained neural network, and
the processor is further configured to:
obtain the source feature map by performing feature extraction on an input image with the trained neural network;
perform convolution for the source feature map by a content encoding convolution layer in the trained neural network; and
obtain a processing result of the input image according to the target feature map after the target map generating module generates the target feature map.

16. The device according to claim 15, wherein the processor is further configured to:
perform channel compression for the source feature map by a channel compression convolution layer in the trained neural network; and
perform convolution on the channel-compressed source feature map by the content encoding convolution layer.

17. The device according to claim 15,
wherein the input image comprises at least one target object to be detected, and the processor is further configured to output a bounding box of each target object in the input image and a class of the target object according to the target feature map, or
wherein the input image comprises a missing part, and the processor is further configured to output pixels of the missing part of the input image according to the target feature map.

18. The device according to claim 15, wherein the processor is further configured to:
output each instance of the input image and a class of each pixel in each instance of the input image according to the target feature map; or
output the class of each pixel in the input image according to the target feature map.

19. A non-transitory computer readable storage medium storing computer programs, wherein the computer programs are executed by a processor to perform operations comprising:
receiving a source feature map to be magnified;
obtaining N reassembly kernels corresponding to each source position in the source feature map by performing convolution on the source feature map, wherein N refers to a square of a magnification factor of the source feature map;
obtaining, for each of the reassembly kernels, a normalized reassembly kernel by performing normalization;
obtaining, for each source position in the source feature map, N reassembly features corresponding to the source position by reassembling features of a reassembly region determined according to the source position with N normalized reassembly kernels corresponding to the source position; and
generating a target feature map according to the N reassembly features corresponding to each source position in the source feature map.

20. The storage medium according to claim 19, wherein performing convolution on the source feature map comprises:
obtaining reassembly kernel maps with $C_{up}$ channels by performing convolution on the source feature map with $C_{up}$ filters, wherein $C_{up}$ is determined according to the magnification factor and a size of the reassembly kernel; and
for each source position in the source feature map, dividing convolution output features in the $C_{up}$ channels that correspond to the source position into N equal parts, wherein each of the parts is taken as one of the reassembly kernels corresponding to the source position and comprises convolution output features in $C_{up}/N$ channels.

* * * * *